United States Patent
Yamazaki

(10) Patent No.: US 8,103,113 B2
(45) Date of Patent: Jan. 24, 2012

(54) IMAGE PROCESSING APPARATUS AND IMAGE PROCESSING METHOD

(75) Inventor: Akio Yamazaki, Shiojiri (JP)

(73) Assignee: Seiko Epson Corporation, Tokyo (JP)

( * ) Notice: Subject to any disclaimer, the term of this patent is extended or adjusted under 35 U.S.C. 154(b) by 929 days.

(21) Appl. No.: 12/118,511

(22) Filed: May 9, 2008

(65) Prior Publication Data

US 2008/0279477 A1    Nov. 13, 2008

(30) Foreign Application Priority Data

May 10, 2007  (JP) .................................. 2007-125635

(51) Int. Cl.
*G06K 9/36*    (2006.01)
*G06K 15/00*   (2006.01)
*G06F 3/12*    (2006.01)

(52) U.S. Cl. ....... 382/232; 382/276; 358/1.13; 358/1.17

(58) Field of Classification Search .................. 382/232, 382/276; 358/1.13, 1.17
See application file for complete search history.

(56) References Cited

U.S. PATENT DOCUMENTS

| 5,825,994 | A  | * | 10/1998 | Kumada ....................... 358/1.17 |
| 6,426,747 | B1 | * | 7/2002  | Hoppe et al. ................... 345/419 |
| 6,498,866 | B2 | * | 12/2002 | Charrier et al. ............... 382/248 |
| 6,542,255 | B1 | * | 4/2003  | Nakamura .................... 358/1.17 |
| 6,963,412 | B1 | * | 11/2005 | Toda ............................ 358/1.13 |
| 7,271,923 | B1 | * | 9/2007  | Wakana ....................... 358/1.13 |
| 2002/0176101 | A1 | * | 11/2002 | Tsunekawa .................... 358/1.9 |
| 2005/0213119 | A1 | * | 9/2005  | Clark et al. ..................... 358/1.2 |
| 2006/0192986 | A1 | * | 8/2006  | Suzuki ......................... 358/1.13 |

FOREIGN PATENT DOCUMENTS

JP    2004-318204    11/2004

* cited by examiner

*Primary Examiner* — Wenpeng Chen
(74) *Attorney, Agent, or Firm* — DLA Piper LLP (US)

(57) ABSTRACT

An image processing apparatus which enables reduction of memory size required for image modification is provided. The image processing apparatus establishes a target block of the modification process; generates an image within the target block by storing an image within a referent block into a source memory area, and by referring the referent block image in the source memory area; generates entirety of the post-modification image by sequentially shifting the target block to a different position within the image modification area and by generating an image within the target block after each shift; computes a maximum block size of the referent block associated with the target block situated any available position prior to generation of the image; and allocates the source memory area capable of storing an image of a size equal to the maximum block size.

4 Claims, 16 Drawing Sheets

DIVIDING POINT SHIFT TABLE

|     | H  | V  |
|-----|----|----|
| D11 | 7  | 14 |
| D21 | 7  | 14 |
| D31 | -7 | 14 |
| D41 | -7 | 14 |
| D12 | 7  | 0  |
| D22 | 0  | 0  |
| D32 | 0  | 0  |
| D42 | -7 | 0  |

DIVIDING POINT SHIFT PATTERN

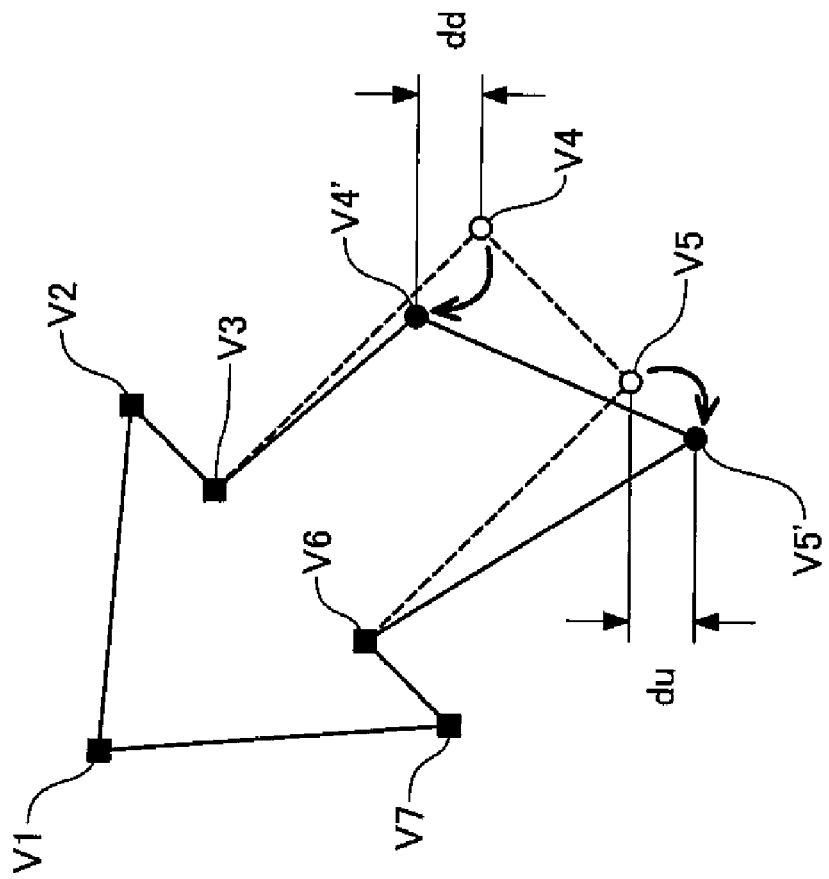
Fig.10B AFTER MODIFICATION
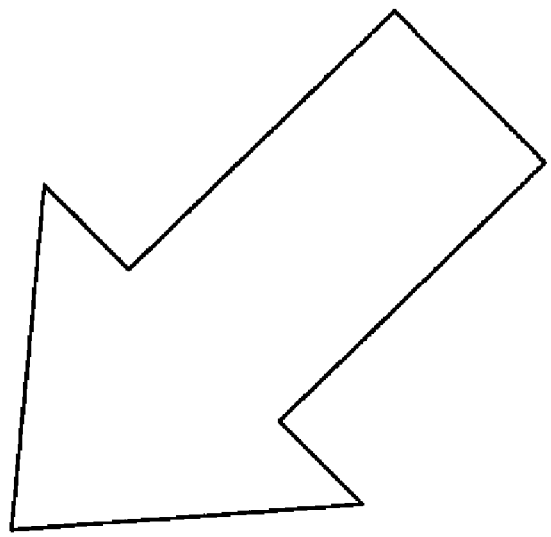
Fig.10A BEFORE MODIFICATION

| BEFORE MODIFICATION (SOURCE IMAGE) | AFTER FIRST MODIFICATION PROCESS | AFTER SECOND MODIFICATION PROCESS |

Fig.14A

ESTABLISH IMAGE GENERATING LINE

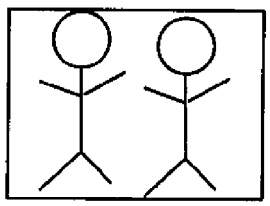  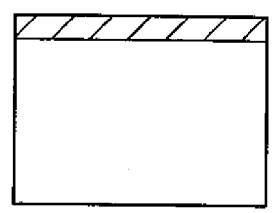

Fig.14B

IDENTIFY REFERENT RANGE OF IMAGE GENERATING LINE

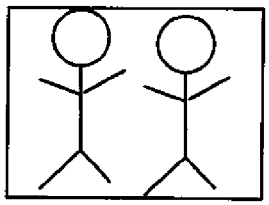  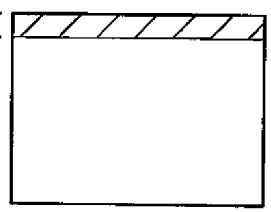

Fig.14C

IDENTIFY REFERENT OF REFERENT RANGE

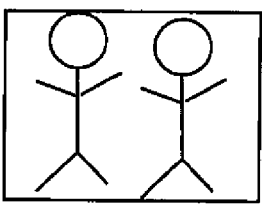 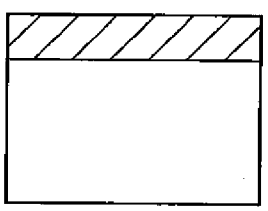 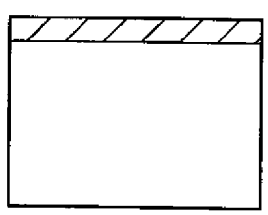

Fig.14D

GENERATE MODIFIED IMAGE IN REFERENT RANGE THROUGH FIRST MODIFICATION PROCESS

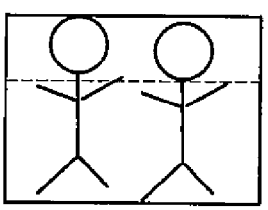 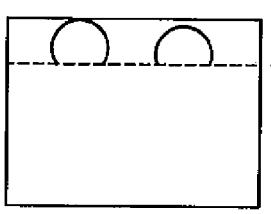 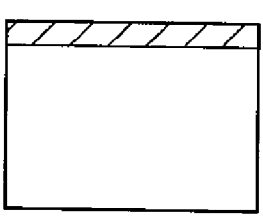

Fig.14E

GENERATE POST-MODIFICATION IMAGE ON IMAGE GENERATING LINE THROUGH SECOND MODIFICATION PROCESS

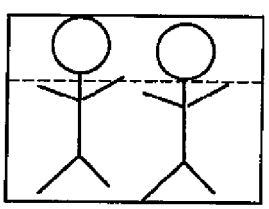 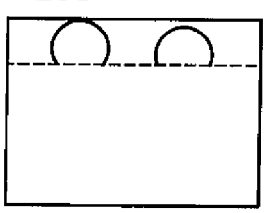 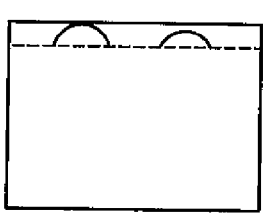

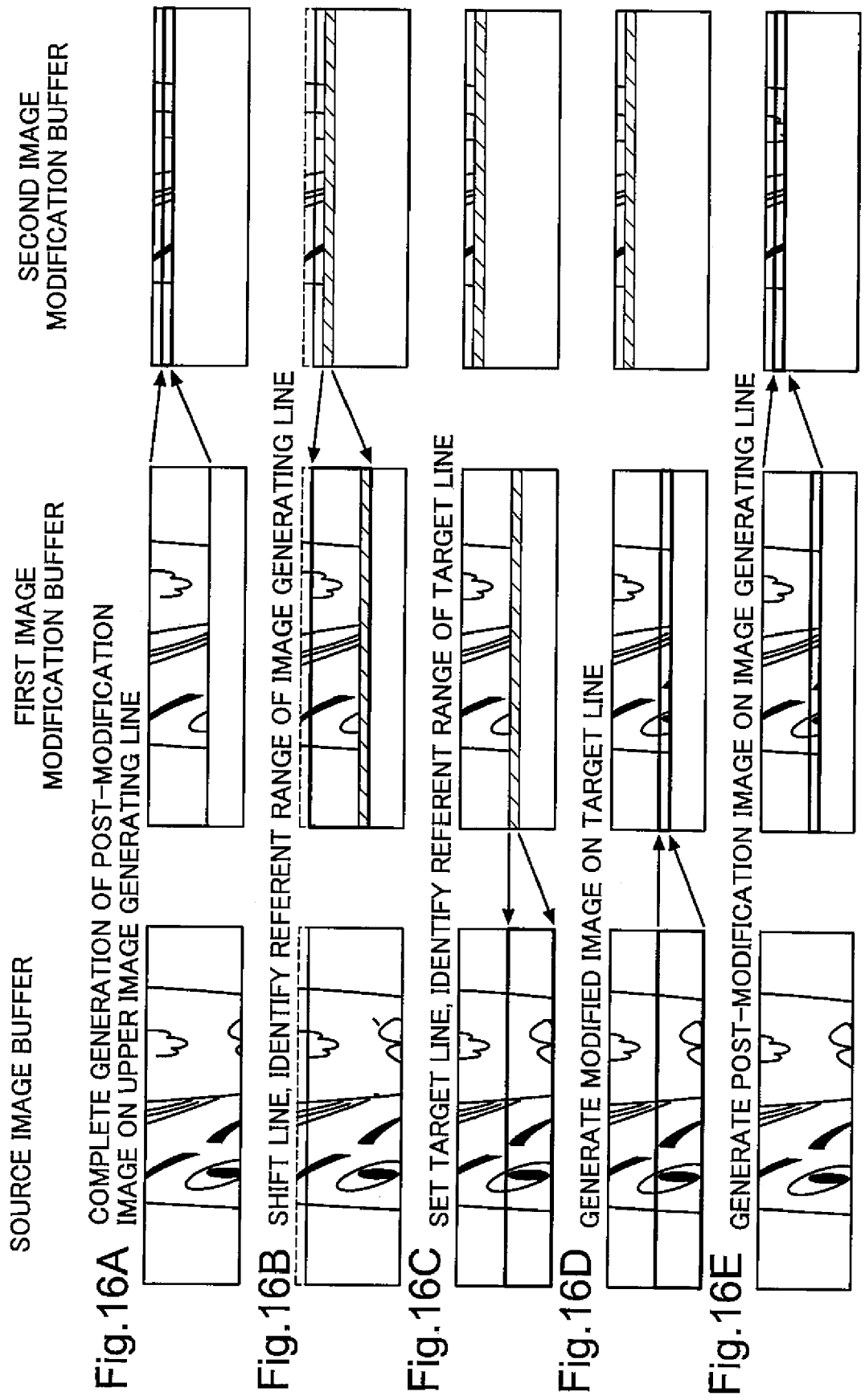

IMAGE PROCESSING APPARATUS AND IMAGE PROCESSING METHOD

CROSS-REFERENCE TO RELATED APPLICATIONS

The present application claims the priority based on Japanese Patent Application No. 2007-125635 filed on May 10, 2007, the disclosure of which is hereby incorporated herein by reference in its entirety.

BACKGROUND OF THE INVENTION

1. Field of the Invention

The present invention relates to image processing technology for carrying out modification processes on images.

2. Description of the Related Art

In an image modification process, a process termed "mapping" is performed. The image modification with the mapping process is executed by associating a pixel constituting a modified image (a referrer pixel) to a pixel constituting a source image (a referent pixel) which is a subject of the image modification process, and by assigning a pixel value of the referent pixel to a pixel value of the referrer pixel.

In the image modification process employing mapping in this way, the positional relationship among the referrer pixel and the referent pixel may vary depending on the position of the referrer pixels within the modified image, in accordance with contents of the modification process. To reduce affect of the varying of the positional relationship, the conventional image modification process employing mapping is performed on a memory area which is able to store entire images before and after modification.

However, in some instances, it may not be possible to allocate a memory area sufficient to store the entire images before or after modification due to the size of the image targeted for modification or the memory capacity of the image processing apparatus used for image processing. In this case it is not possible to perform the image modification process.

SUMMARY

An object of the present invention is to reduce memory size required for an image modification process.

According to an aspect of the present invention, an image processing apparatus that carries out a modification process on a pre-modification image to generate a post-modification image within an image modification area is provided. The image processing apparatus has a target block setting unit that establishes a target block as a destination of the modification process, the target block constituting the image modification area; a block modification unit that generates an image within the target block by storing an image included in a referent block, which is associated with the target block, into a source memory area, and by referring the image included in the referent block stored in the source memory area as a source of the modification process; a block scanning unit that generates entirety of the post-modification image by sequentially shifting the target block to a different position within the image modification area, and by causing the block modification unit to generate an image within the target block after each shift; a maximum block size computing unit that computes a maximum block size of the referent block associated with the target block situated any available position, the maximum block being computed prior to generation of the image of the target block by the block modification unit; and a source memory area allocating unit that allocates the source memory area capable of storing an image of a size equal to the maximum block size computed by the maximum block size computing unit.

With this arrangement, the maximum block size of a referent block associated with a target block which situated any available position is computed, prior to generation of an image of the target block image by the block modification unit. Then, a source memory area sufficient to store an image of size equivalent to the maximum block size is allocated. Thus, it is possible to store a pre-modification image used for generation of an image within the target block thereby the modification process can be carried out on block-by-block basis. By carrying out the modification process on block-by-block basis, the memory area used for the modification process may be reduced, and the memory size required for the image modification process is reduced.

It is available to configure the image processing apparatus so that the image processing apparatus is capable of generating a multiply-modified image by carrying out the modification process on the source image for N times (where N is an integer equal to 2 or greater), the maximum block size computing unit has an utmost block size computing unit that computes an utmost block size prior to the N modification processes by taking a logical summation of N referent blocks, each of the N referent blocks being referred from a target block established within the image modification area of the multiply-modified image in each of the N modification processes, the memory area allocating unit allocates N source memory areas capable of storing images of a size equal to the utmost block size, each of the source memory area corresponding to each of the modification processes, and of the N source memory areas, the i-th (i is an integer from 1 to N) source memory area is used as the source of the i-th modification process, and as the destination of the (i-1)th modification process.

With this arrangement, a number N of source memory areas, which are sufficient to store images of size equivalent to an utmost block size, corresponding to each of the modification processes are allocated. Thus, in any modification of N modification processes, it is possible to store a source image used for generation of a destination image in the source memory area. Accordingly, even when the image modification is achieved through the multiple modification processes, each of the multiple modification processes can be carried out on block-by-block basis, and thereby a memory size required for the image modification process may be reduced.

These and other objects, features, aspects, and advantages of the present invention will become more apparent from the following detailed description of the preferred embodiments with the accompanying drawings.

BRIEF DESCRIPTION OF THE DRAWINGS

FIGS. 10A and 10B illustrate bandwidth required for image modification;

FIGS. 14A through 14E are illustrations depicting generation of a transformed image through the line modification process;

FIGS. 16A through 16E are illustrations depicting the band buffer when the image modification process is carried out.

DESCRIPTION OF THE PREFERRED EMBODIMENT

A. Embodiment

Figure 1:
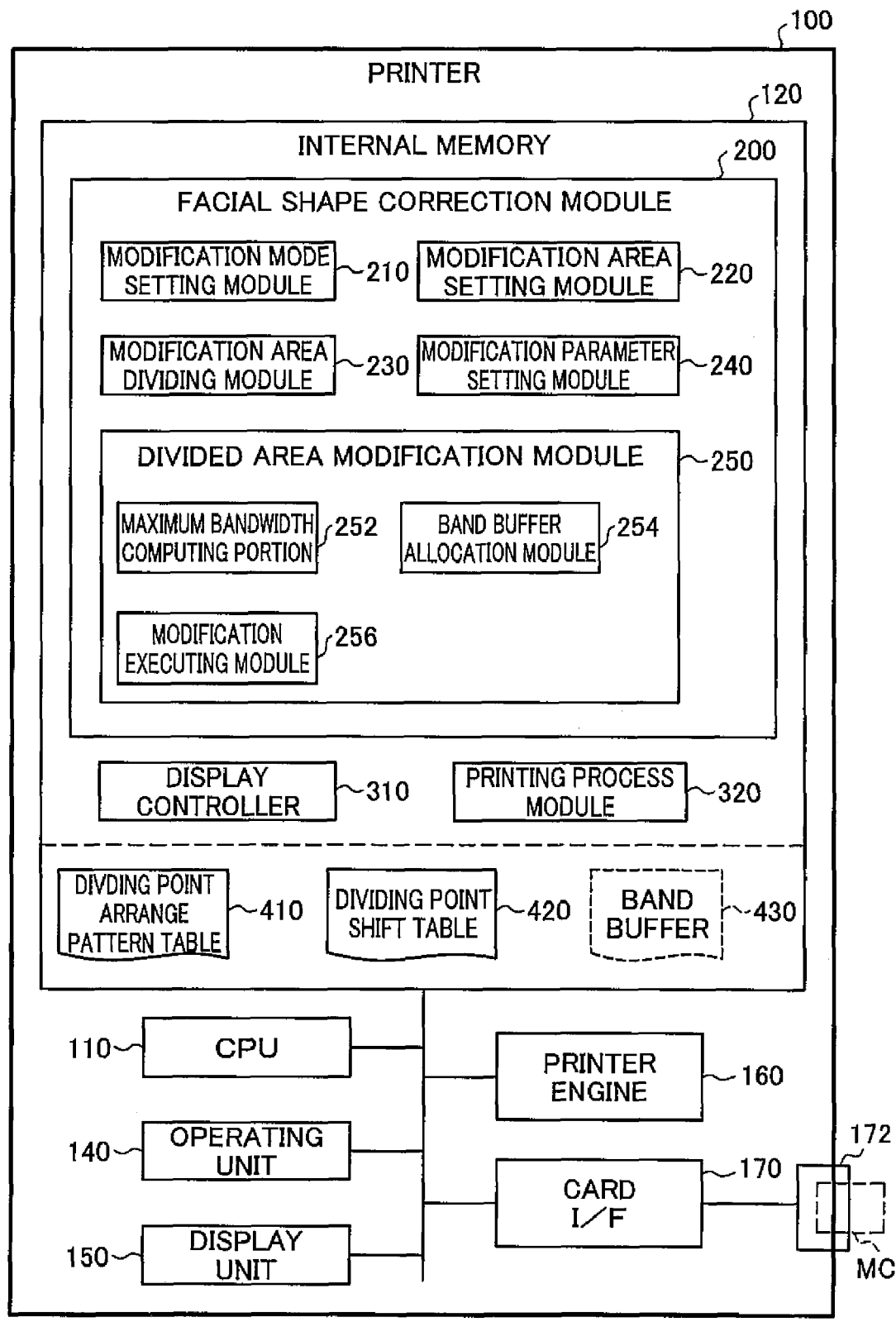
FIG. 1 is an illustration schematically depicting a configuration of a printer 100 in which an image processing apparatus is implemented as an embodiment of the present invention.

FIG. 1 is an illustration schematically depicting a configuration of a printer 100 in which an image processing apparatus is implemented as an embodiment of the present invention. The printer 100 is a color ink-jet printer which is compatible with so-called direct printing whereby images are printed on the basis of image data obtained from a memory card or other medium. The printer 100 has a CPU 110 for controlling the various components of the printer, an internal memory 120 composed of ROM and RAM for example, a operating unit 140 including buttons or a touch panel, a display unit 150 including a liquid crystal display, a printer engine 160, and a card interface (card I/F) 170. The printer 100 may also have an interface for data communication with other devices (e.g. a digital still camera or personal computer). The components of the printer 100 are interconnected by a bus.

The printer engine 160 is a printing mechanism for carrying out printing on the basis of print data. The card interface 170 is an interface for exchanging data with a memory card MC inserted into a memory card slot 172. In this embodiment, image data is stored as RGB data on the memory card MC. The printer 100 obtains image data stored on the memory card MC, via the card interface 170.

A facial shape correction module 200, a display controller 310, and a printing process module 320 are stored in the internal memory 120. The facial shape correction module 200 is a computer program which runs on a prescribed operating system and carries out a facial shape correction process discussed later. The display controller 310 is a display driver which controls the display unit 150 and displays on the display unit 150 operation menus, notification messages and so on. The printing process module 320 is a computer program to execute printing of an image based on the print data which generates print data from image data, and controls the printer engine 160. The CPU 110 loads these programs, which are stored on a non-transitory computer-readable medium of a computer program product, from the internal memory 120 and executes them to realize the functions of the various modules.

The facial shape correction module 200 includes as program modules a modification mode setting module 210, a modification area setting module 220, a modification area dividing module 230, a modification parameter setting module 240, and a divided area modification module 250. The divided area modification module 250 includes a maximum bandwidth computing module 252, a band buffer allocation module 254, and a modification executing module 256. The functions of these modules will be discussed later.

Also stored in the internal memory 120 are a dividing point arrange pattern table 410 and a dividing point shift table 420. A band buffer 430 is a memory area allocated within the internal memory 120 by the band buffer allocation module 254 in the manner described later. The contents of the dividing point arrange pattern table 410 and the dividing point shift table 420, and the function of the band buffer 430, will be described later.

Figure 2:
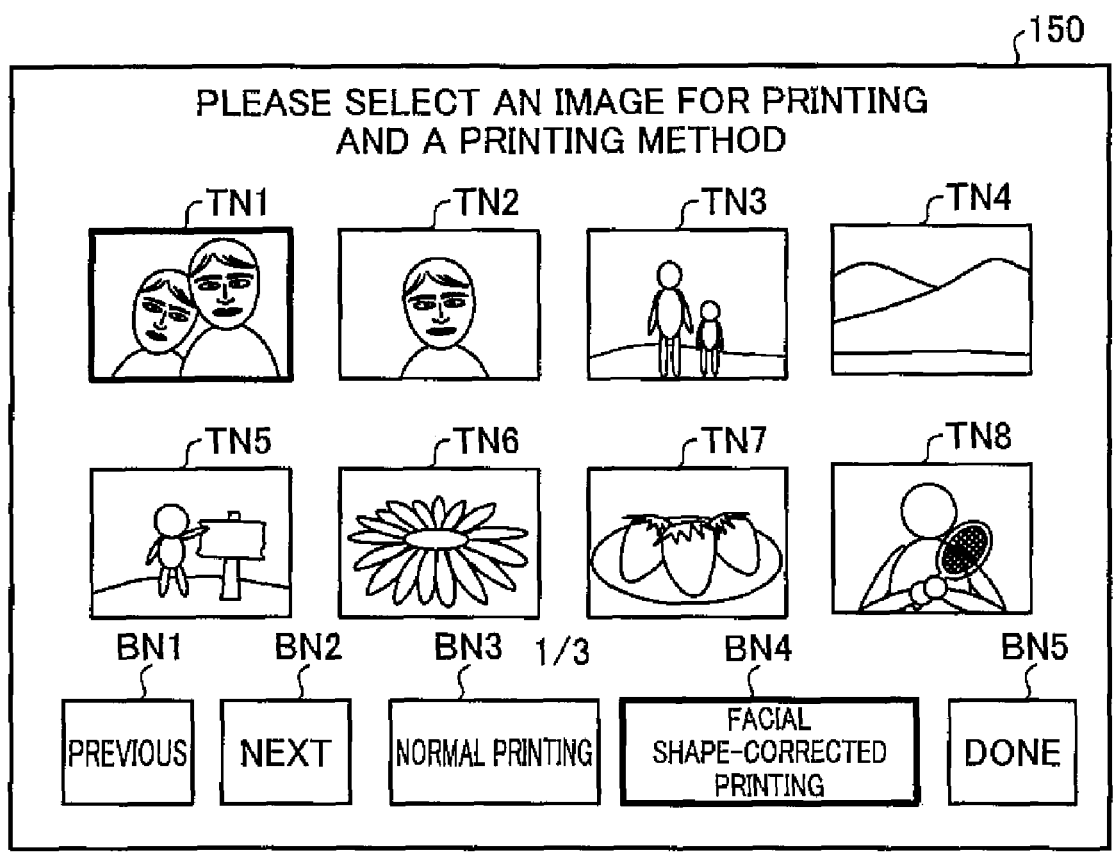
FIG. 2 is an illustration depicting an example of a user interface including an image listing.

The printer 100 carries out printing of images on the basis of the image data stored on the memory card MC. When the memory card MC is inserted into the card slot 172, the display controller 310 displays on the display unit 150 a user interface including a listing of the images stored on the memory card MC. FIG. 2 is an illustration depicting an example of a user interface including an image listing. In this embodiment, image listing is generated using the thumbnail images which are included in the image data (image files) stored on the memory card MC. In the user interface depicted in FIG. 2, eight thumbnail images TN1 through TN8 and five buttons BN1 through BN5 are displayed.

When the user selects an image on the user interface and operates the "NORMAL PRINTING" button BN3, the printer 100 executes a normal printing process for printing the selected image in ordinary way. On the other hand, when the user selects an image on the user interface and operates the "FACIAL SHAPE-CORRECTED PRINTING" button BN4 from the user interface, the printer 100 executes a facial shape-corrected printing process for the selected image. With the facial shape-corrected printing process the shape of a face or faces in the image is corrected, and the corrected image is then printed. In the example of FIG. 2, the thumbnail image TN1 is selected and the "FACIAL SHAPE-CORRECTED PRINTING" button BN4 is operated. Accordingly, the printer 100 corrects the shape of the faces for the image corresponding to thumbnail image TN1 and print the corrected image.

Figure 3:
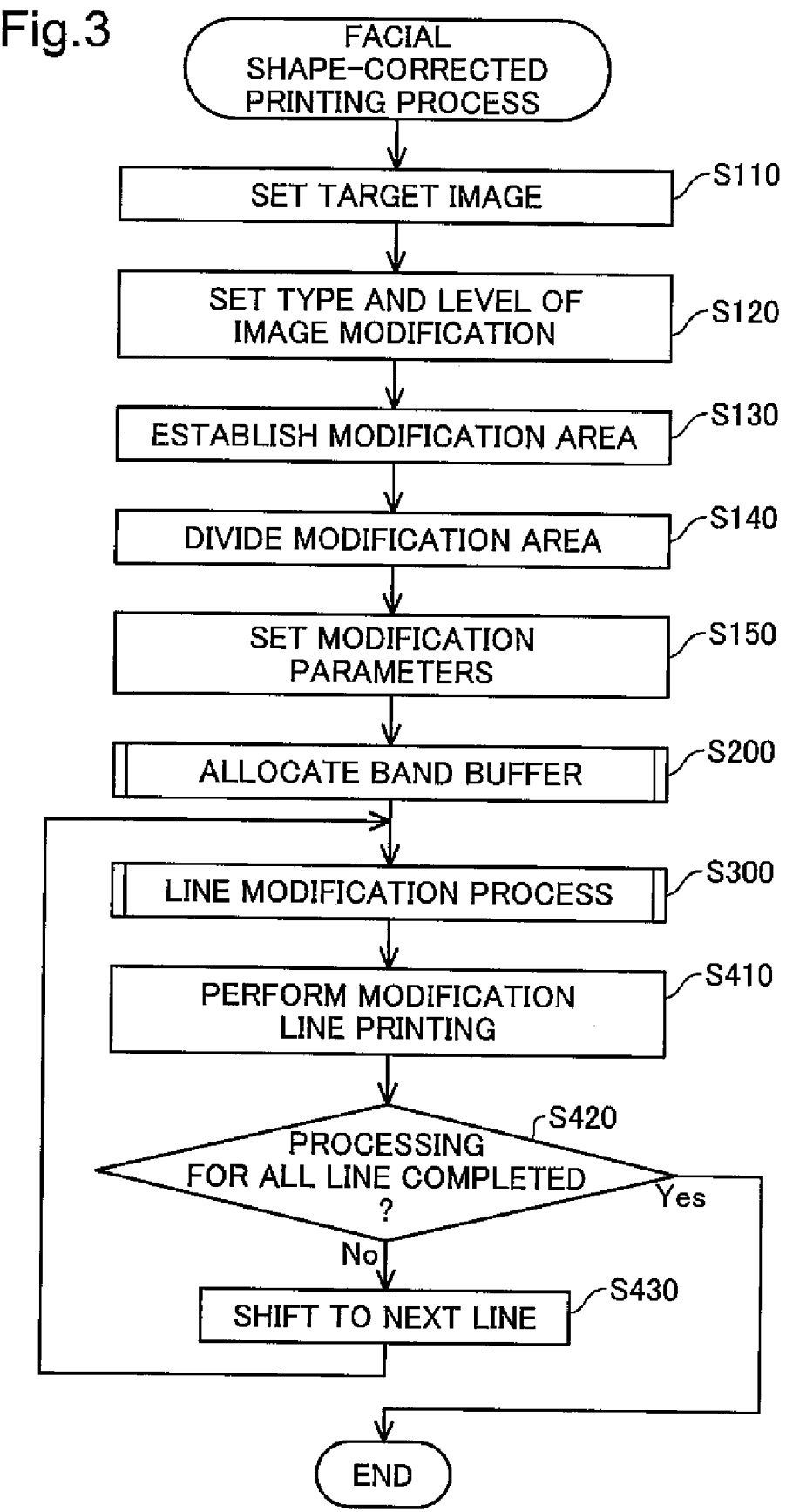
FIG. 3 is a flowchart showing the facial shape-corrected printing process executed by the printer 100.

FIG. 3 is a flowchart showing the facial shape-corrected printing process executed by the printer 100, when the printer 100 carries out facial shape-corrected printing. As noted above, this facial shape-corrected printing process is executed by the printer 100 in response to operation of the "FACIAL SHAPE-CORRECTED PRINTING" button BN4 on the user interface by the user.

In Step S110, the facial shape correction module 200 (FIG. 1) sets a target image targeted for the facial shape-corrected printing process. The facial shape correction module 200 sets as the target image the image corresponding to the thumbnail image TN1 which is selected by the user in the user interface shown in FIG. 2. Hereinafter, the original image which is targeted for facial shape correction is also referred to as the "source image," and the image data which represents the source image is also referred to as the "source image data." Since the source image is an image before modification, the source image is also called as "pre-modification" image.

In Step S120, the modification mode setting module 210 (FIG. 1) sets the type of image modification and the level of image modification for facial shape correction. The modification mode setting module 210 instruct the display controller 310 to display on the display unit 150 a user interface for setting the type and level of image modification. The user specifies the type and the level of image modification with the user interface. The modification mode setting module 210 determines the user's specification, and sets the type and the level of image modification which are used in the modification process.

Figure 4:
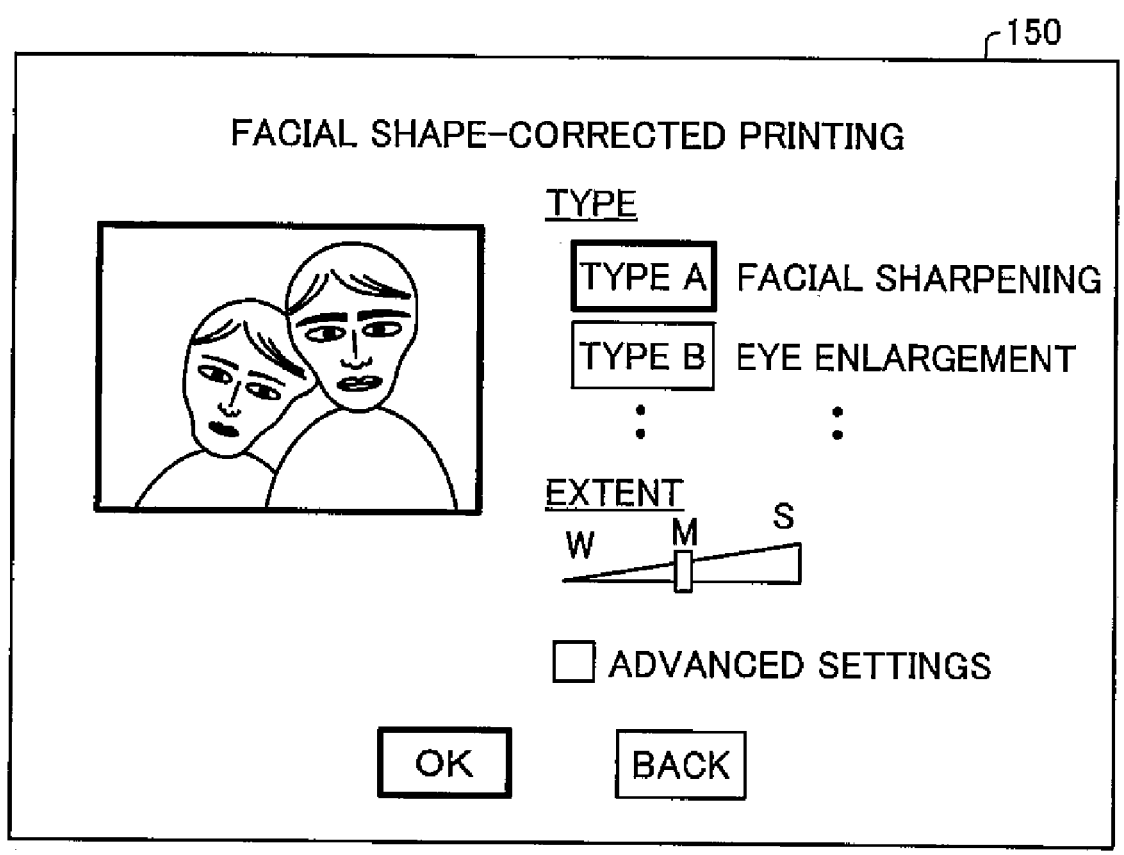
FIG. 4 is an illustration depicting an example of a user interface for setting the type and the level of image modification.

FIG. 4 is an illustration depicting an example of a user interface for setting the type and the level of image modification. As shown in FIG. 4, this user interface includes an interface for setting image modification type, and a preview screen for previewing correction results. As image modification types there have been established in advance a plurality of choices, for example, a "TYPE A" modification type which sharpens facial shapes, a "TYPE B" modification type which enlarges the shape of the eyes, and so on. By operating this interface, the user selects from among the multiple choices for image modification type. The modification mode setting module 210 then sets the image modification type selected by the user as the image modification type to be used in actual processing.

The user interface shown in FIG. 4 also includes an interface for setting the level (extent) of image modification. As levels of image modification, there have been established in advance choices among the three levels of Strong (S), Medium (M), and Weak (W), for example. The user operates this interface and specifies the level of image modification. The modification mode setting module 210 then sets the level of image modification specified by the user as the level of image modification to be used in actual processing. The checkbox provided in the user interface may be checked when the user wishes to make advanced settings for modification mode.

When the user operates the various interfaces provided to the user interface shown in FIG. 4, the facial shape correction module performs a modification process to a reduced image, which is a reduced version of the source image, and displays the image which undergoes the modification process as a thumbnail image. It is also possible not to display a thumbnail image.

The following discussion will proceed on the assumption that the "TYPE A" modification type which sharpens facial shapes is set as the image modification type, that a level of "Medium" extent is set as the level of image modification, and that the user does not wish to make advanced settings.

In Step S130 (FIG. 3), the modification area setting module 220 establishes an area for carrying out the image modification process (modification area) for the purpose of facial shape correction. In the modification area setting process, first, detection of facial areas is carried out. The position and direction of detected facial areas are adjusted. Modification areas are then established on the basis of the result of adjusting position and direction. Facial areas may be detected through the known face detection method of pattern matching using a template (see JP 2004-318204 A), for example.

Figure 5A:
FIGS. 5A and 5B are illustrations depicting an example of establishment results of the modification areas.
Figure 5B:

FIGS. 5A and 5B are illustrations depicting an example of establishment results of the modification areas. FIG. 5A shows the results of facial area detection, FIG. 5B shows the modification areas established on the basis of the detected facial areas. In the example of FIGS. 5A and 5B, the target image TI includes two persons. Thus, as indicated by the heavy lines in FIG. 5A, two facial areas FA1, FA2 corresponding to each of the two persons are detected from the target image TI. These facial areas FA1, FA2 are areas of oblong shape each including images of eyes, mouth, and nose. The broken lines in FIG. 5B indicate the two facial areas FA1, FA2, while the heavy lines indicate two modification areas TA1, TA2 established respectively for the two facial areas FA1, FA2.

In Step S140 of FIG. 3, the modification area dividing module 230 divides each of the modification areas established in Step S130 into a plurality of sub-areas. Specifically, the modification area dividing module 230 arranges dividing points in each of the modification area established in Step S130. Then, using straight lines which connect the dividing points, each of the modification area is divided into a plurality of sub-areas. The arrange pattern of dividing points within a modification area (i.e. the number and positions of the dividing points) is defined by the dividing point arrange pattern table 410 (FIG. 1) in association with the modification type set in Step S120 (FIG. 3). As shown in FIG. 4, where the "TYPE A" modification for facial sharpening is selected as the modification type, the modification area is divided into 15 sub-areas of oblong shape.

Figure 6A:
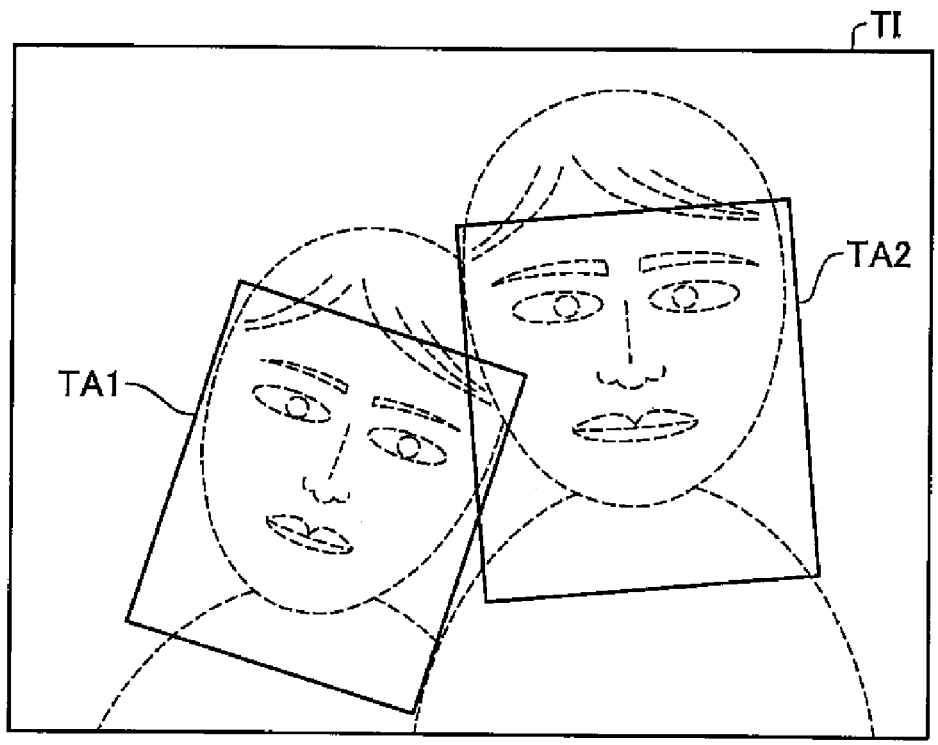
FIGS. 6A and 6B are illustrations depicting division of each of the two modification areas TA1, TA2 into sub-areas.
Figure 6B:
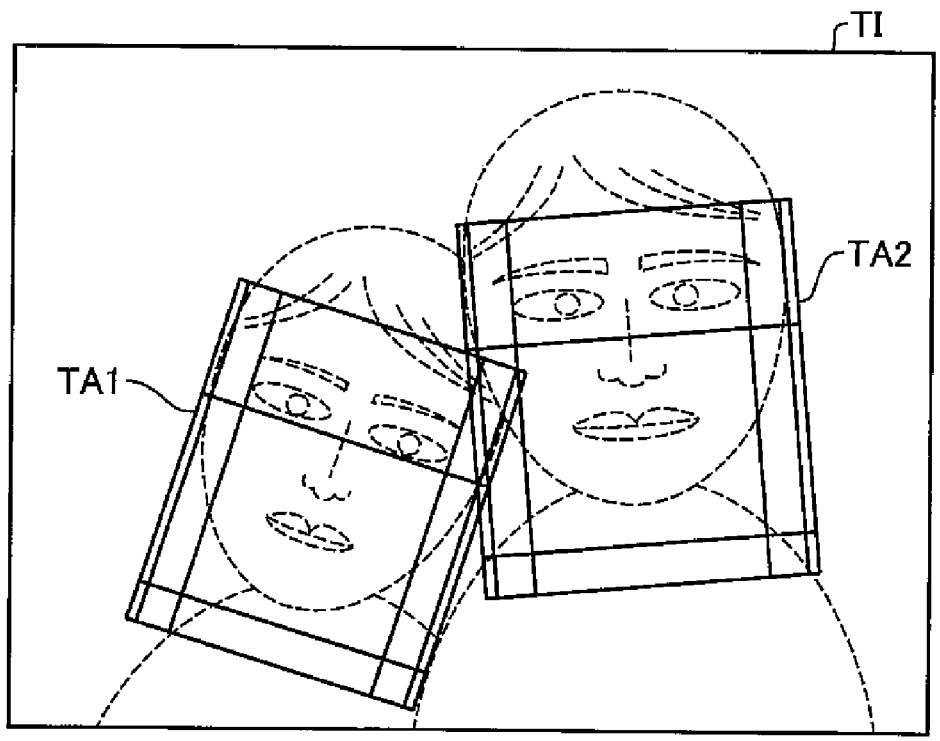

FIGS. 6A and 6B are illustrations depicting division of each of the two modification areas TA1, TA2, which are established in Step S130 of FIG. 3, into sub-areas. FIG. 6A depicts placement of the two modification areas TA1, TA2 established in Step S130 of FIG. 3. FIG. 6B depicts each of the two modification areas TA1, TA2 divided into sub-areas in Step S140. In this embodiment, "TYPE A" modification is selected as the modification type. Thus, as shown in FIG. 6B, each of the two modification areas TA1, TA2 is divided into 15 sub-areas of oblong shape.

In Step S150 of FIG. 3, the modification parameter setting module 240 sets various parameters for carrying out the modification process to the modification areas. Specifically, a shift pattern (i.e. direction of shift and shift distance) of the dividing points used to divide the modification areas into sub-areas is established. The shift pattern of dividing point is specified in advance with the dividing point shift table 420 (FIG. 1), in association with combinations of modification type and level set in Step S120 (FIG. 3). Where, as mentioned earlier, "TYPE A" modification (see FIG. 4) for facial sharpening is set as the modification type and a level of "Medium" extent is set as the level of image modification, the dividing point shift pattern is set to a direction of shift and shift distance which are associated with this combination of modification type and level.

Figures 7A, 7B:
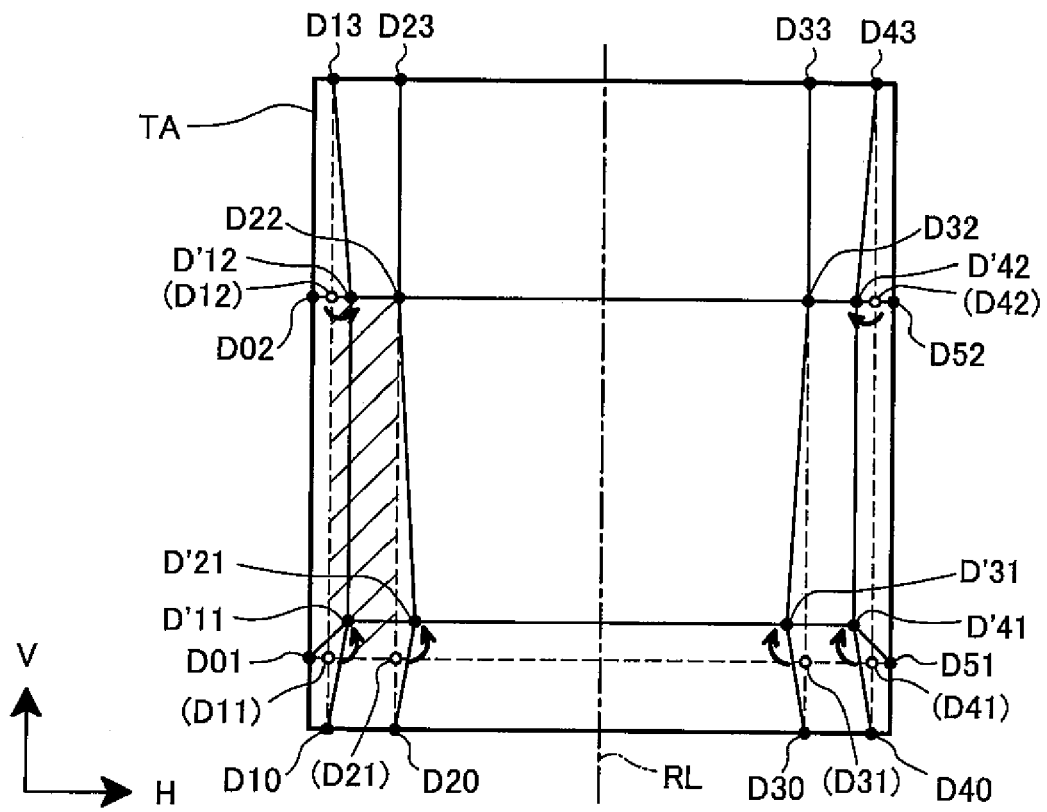
FIGS. 7A and 7B are illustrations depicting the modification parameter settings.

FIGS. 7A and 7B are illustrations depicting the modification parameter settings. FIG. 7A shows an example of the contents of the dividing point shift table 420 which is looked up by the modification parameter setting module 240. FIG. 7B depicts a dividing point shift pattern in accordance with the dividing point shift table 420 shown in FIG. 7A.

The dividing point shift table 420 indicates, for each of the dividing points D11 through D42, amounts of shift along the direction perpendicular to a reference line RL (H direction) and along the direction perpendicular to the reference line RL (V direction). Here, the reference line RL lies in a direction which bifurcates the modification area TA in the vertical direction and which corresponds to the vertical direction of the face. Amounts of shift shown in the dividing point shift table 420 are expressed in units of pixel pitch PP on the image. For the H direction, the amount of shift towards the observer's right is represented by a positive value while the amount of shift towards the observer's left is represented by a negative value. For the V direction, the amount of shift upward is represented by a positive value while the amount of shift downward is represented by a negative value. For example, the dividing point D11 is shifted rightward along the H direction by a distance equivalent to 7 times of the pixel pitch PP and upward along the V direction by a distance equivalent to 14 times of the pixel pitch PP. Also, for example, the dividing point D22 does not shift at all, since the amount of shift is zero in both the H direction and V direction.

By setting the shift pattern of the dividing points in this way, the dividing points within the modification area TA shift from positions indicated by white circles to positions indicated by black circles, as shown in FIG. 7B. In FIG. 7B, positions of dividing points which does not shift are also shown by black circles. By setting the modification parameters in this way, during the modification process, images within the sub-areas indicated by the broken lines in the modification area TA are modified to images within the sub-areas indicated by the solid lines. For example, the image in the sub-area having the dividing points D11, D21, D22, and D12 as apices (the sub-area shown with hatching) is modified into an image in the sub-area having the dividing points D'11, DP'21, D'22, and D'12 as apices.

Modification of an image inside a sub-area is accomplished through association of points within the modified sub-area with points in the sub-area prior to modification (mapping). Modification through mapping involves computing referent position of corresponding pixel (referent pixel) of the sub-area prior to modification, from the position (target pixel position) of target pixel in the modified sub-area. The pixel values of the referent pixel in the sub-area prior to modification is then assigned to the pixel values of the target pixel in order to carry out modification of the image within the sub-area. In the event that a referent position deviates from the position of a pixel of a sub-area prior to modification, a pixel value is computed by an interpolation process (e.g. the bi-linear method or bi-cubic method) from pixels neighboring the reference position, and the computed pixel value is assigned to the pixel value of the target pixel. Hereinafter, a virtual pixel of which pixel value is computed by an interpolation process in this way is also termed as a referent pixel.

As shown in FIG. 6A, the two modification areas TA1, TA2 established in Step S130 overlap one another. Where modification areas overlap in this way, in Step S140 the modification parameter setting module 240 determines a priority for modification of the overlapping modification areas. For example, the modification priority is set through the modification area position. In this case, it is possible to establish higher priority for the modification area TA2 with higher upper edge, for example. The priority for modification may also be established on the basis of other parameters such as the size of the modification area. Hereinafter, a modification area of higher priority is termed a "higher order" modification area, and the process of modification of such a higher order modification area is termed a "higher order" modification process. A modification area lower in the priority is termed a "lower order" modification area, and the process of modification of such a lower order modification area is termed a "lower order" modification process.

Figure 8:
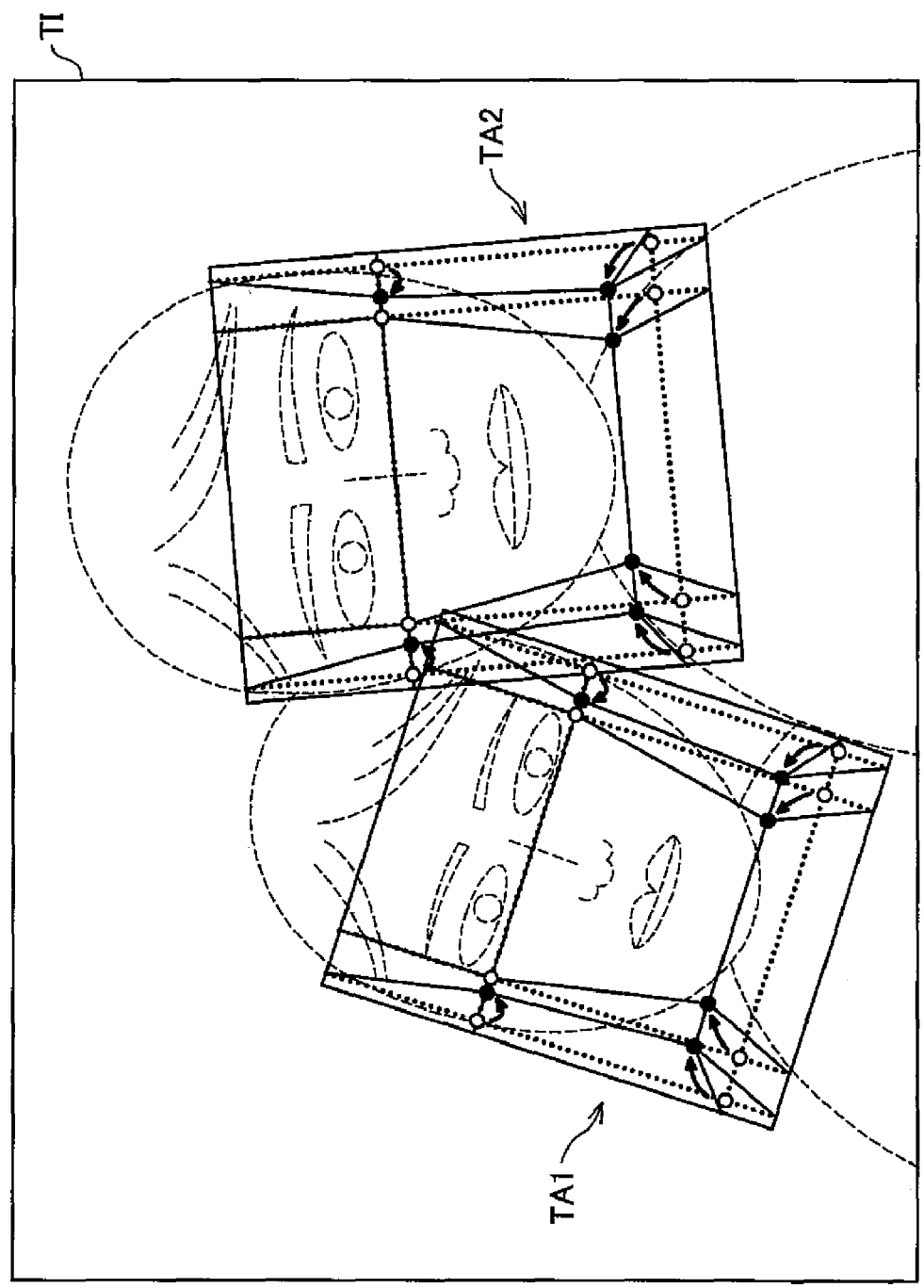
FIG. 8 is an illustration depicting the two modification areas TA1, TA2 with the modification parameter settings made in Step S150.

FIG. 8 is an illustration depicting the two modification areas TA1, TA2 with the modification parameter settings made in Step S150. As shown in FIG. 8, the dividing points indicated by the white circles belonging respectively to the two modification areas TA1, TA2 are shifted to the positions indicated by the black circles. Thus, the sub-areas inside the two modification areas TA1, TA2 shown by the dotted lines are modified respectively to the sub-areas shown by the solid lines.

Figure 9:
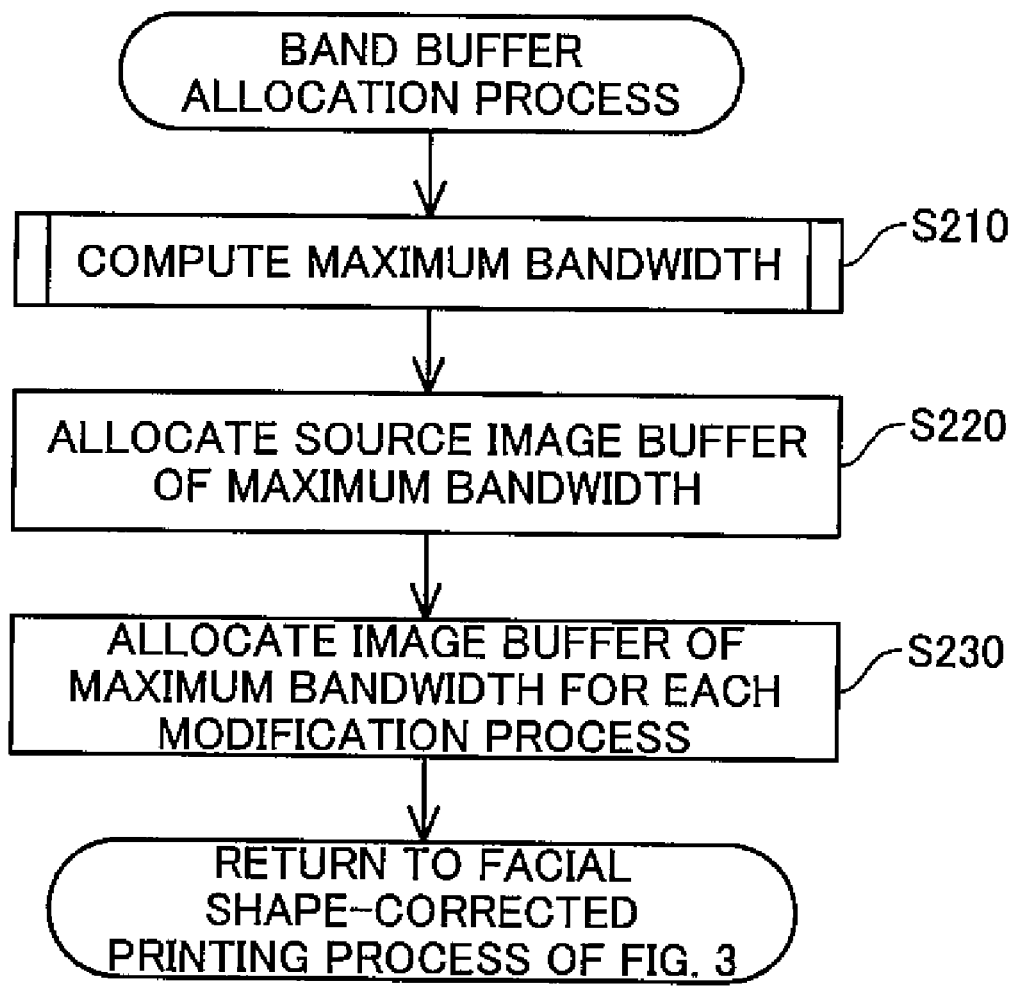
FIG. 9 is a flowchart of allocation process of the band buffer in Step S200.

In Step S200 of FIG. 3, the band buffer allocation module 254 (FIG. 1) allocates a band buffer within the internal memory 120 (FIG. 1). FIG. 9 is a flowchart of allocation process of the band buffer in Step S200.

In Step S210, the band buffer allocation module 254 computes maximum bandwidth. Here, a band refers to an area of band shape which extends in the horizontal direction of the image used in the modification process discussed later, and bandwidth refers to the number of pixels contained in the band in the vertical direction.

FIGS. 10A and 10B illustrate bandwidth required for image modification. In the example of FIGS. 10A and 10B, the image is modified so that the two lower apices of the shape (arrow) shown in FIG. 10A shift in the manner shown in FIG. 10B. The tetragonal points in FIG. 10B indicate non-shifted apices V1 through V3, V6, and V7. The white circles in FIG. 10B show positions of apices V4 and V5 prior to modification, while the black circles show positions of the apices V4' and V5' after modification.

Where the apex V4' subsequent to modification is designated as the target pixel, the referent pixel is the apex V4. Thus, where modification is carried out as from FIG. 10A to FIG. 10B, the pixel value of the referent pixel V4 is referred in order to determine a pixel value for the target pixel V4'. Accordingly, where the image is modified as shown in FIGS. 10A and 10B, bandwidth is set so that both of the target pixel V4' and the referent pixel V4, which is situated below the target pixel V4' at a distance of dd (herein also referred to as "downward displacement"), are included within the band. Similarly, the pixel value of the referent pixel V5 is referred in order to determine a pixel value for the target pixel V5'. Accordingly, where the image is modified as shown in FIGS. 10A and 10B, bandwidth is set so that both of the target pixel V5' and the referent pixel V5, which is situated above the target pixel V5' at a distance of du (herein also referred to as "upward displacement"), are included within the band.

Figure 11:
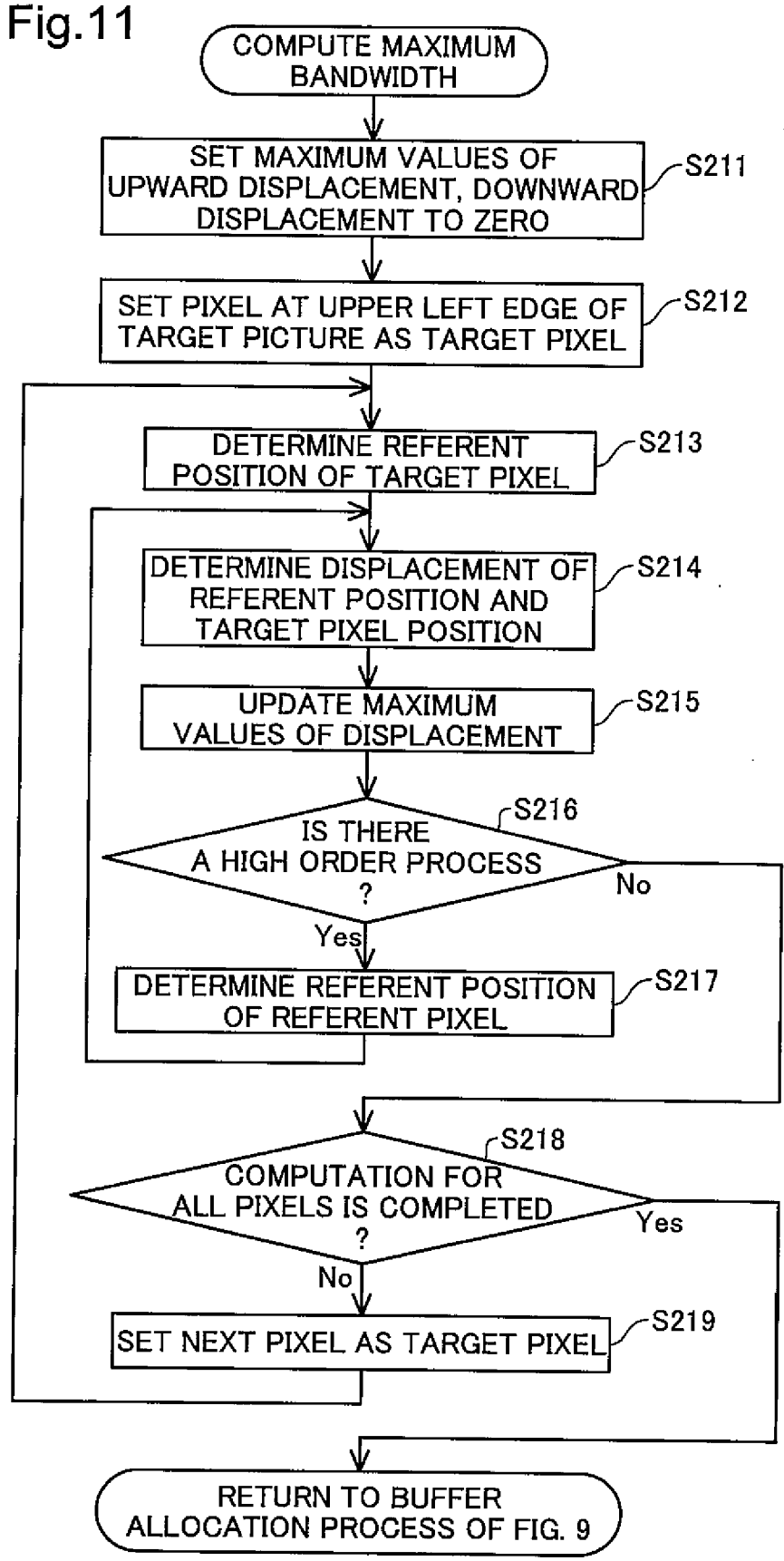
FIG. 11 is a flowchart of the process for computing maximum bandwidth executed in Step S210 of FIG. 9.

FIG. 11 is a flowchart of the process for computing maximum bandwidth executed in Step S210 of FIG. 9. In Step S211, the maximum bandwidth computing module 252 (FIG. 1) sets the maximum values of both upward displacement and downward displacement to zero. Next, the maximum bandwidth computing module 252 sets the pixel at the upper left edge of the target image as the target pixel (Step S212).

In Step S213, the maximum bandwidth computing module 252 determines the referent position of the target pixel. Then, in Step S214, upward displacement or downward displacement of the referent position from the target pixel position (hereinafter upward displacement and downward displacement are also collectively referred to as "displacement" simply) is determined. The determined displacement is then compared with the maximum value of displacement by the maximum bandwidth computing module 252, and the maximum value of displacement is updated (Step S215).

In Step S216, the maximum bandwidth computing module 252 determines whether there is any higher order modification process. If it is determined that there is any higher order modification process, the process advances to Step S217. If it is determined that there is no higher order modification process, the process goes to Step S218.

In Step S217, the maximum bandwidth computing module 252 determines the referent position in the higher order modification process of the referent pixel. After determination of the referent position of the referent pixel, the process returns to Step S214, whereupon Steps S214 through S217 are executed repeatedly until there is no more higher order modification process targeted for determination of referent position.

Figure 12:
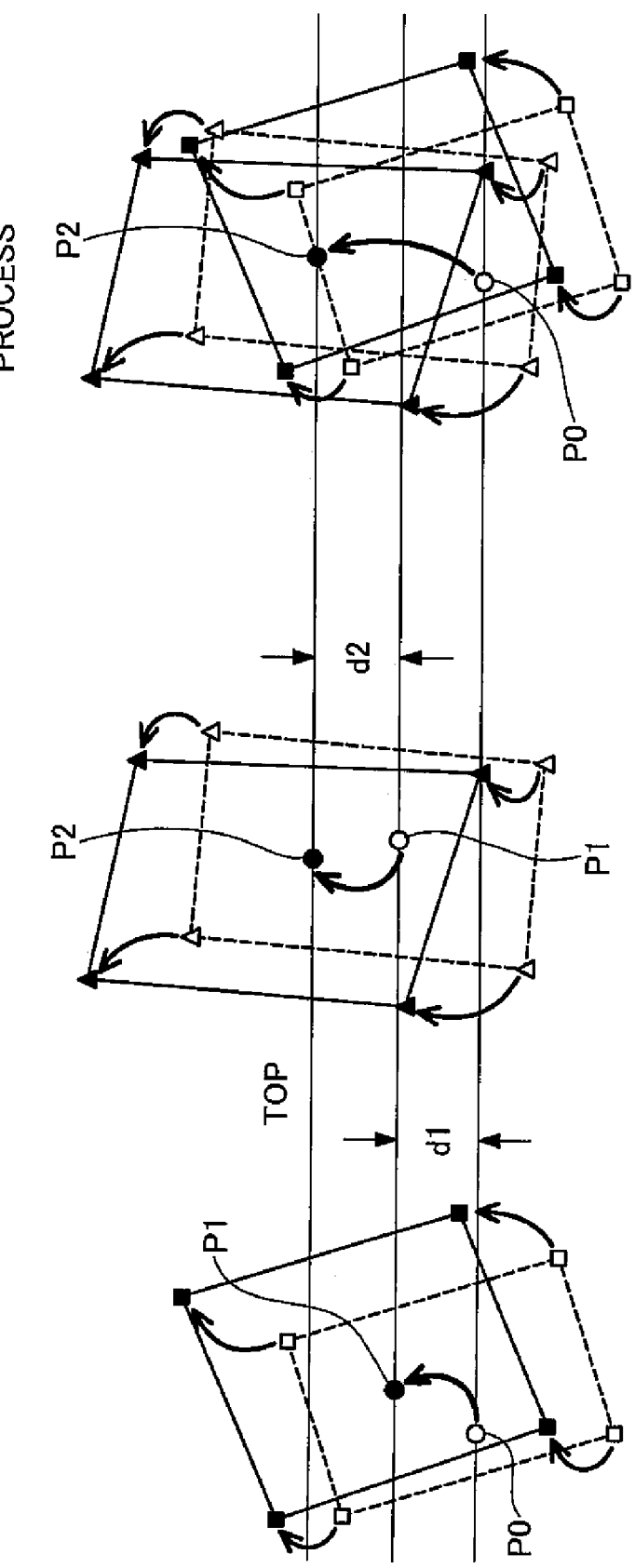
FIGS. 12A through 12C illustrate bandwidth required for carrying out multiple modification processes.

FIGS. 12A through 12C illustrate bandwidth required for carrying out multiple modification processes. In the example of FIGS. 12A through 12C, modification processes are carried out twice through a first modification process and a second modification process. FIG. 12A illustrates carrying out of the first modification process which is a higher order modification process. FIG. 12B illustrates carrying out of the second modification process which is a lower order modification process. FIG. 12C depicts a result of modification processes in which the second modification process is carried out subsequent to the first modification process. In FIGS. 12A through 12C, the broken lines indicate the shape of the sub-area prior to each of modifications, and the solid lines indicate the shape of the sub-area subsequent to each of modifications.

As shown in FIG. 12A, in the first modification process, a sub-area of oblong shape having the white squares as its apices is modified into a sub-area of square shape with the black squares as its apices. Thus, through the first modification process, the pixel P0 (indicated by the white circle) in the sub-area prior to modification is shifted to pixel P1 upward by a distance d1. Similarly, as shown in FIG. 12B, in the second modification process, a sub-area of oblong shape with the white triangles as its apices is modified into a sub-area of square shape with the black triangles as its apices, and the pixel P1 (indicated by the white circle) in the sub-area prior to modification is shifted to pixel P2 upward by a distance d2.

By carrying out the first modification process and the second modification process sequentially in this way, the position of the pixel P0 is shifted to the position of the pixel P2 as shown in FIG. 12C. In Step S213 of FIG. 11, where the target pixel is set to the pixel P2, first, downward displacement d2 is determined in Step S214. Then, since there is a higher order modification process (i.e. the first modification process), in Step S217 the referent position of the referent pixel (pixel P1), that is, the position of the pixel P0, is determined. Thus, in Step S214, the sum of the distance d1 and the distance d2 is determined by way of downward displacement of the target pixel P2, and the maximum value of displacement is updated in Step S215. By repeatedly executing Steps S214 through S217 in this way, even where multiple modification processes are carried out sequentially, it is possible to carry out a modification process of the target pixel P2 by using a band of width equivalent to adding up of upward displacement, downward displacement, and width of target pixel (i.e. 1).

In Step S218 of FIG. 11, the maximum bandwidth computing module 252 determines whether bandwidth computations are carried out for all pixels of the target image. In the event that bandwidth computations are carried out for all pixels of the target image, the process returns to the band buffer allocation process of FIG. 9. On the other hand, in the event that there are pixels for which computation of bandwidth is not carried out, the process advances to Step S219.

In Step S219, the maximum bandwidth computing module 252 set the next pixel of the target pixel as the new target pixel. Specifically, where the target pixel is a pixel not situated at the right edge of the image, the pixel to the right side of the target pixel is set as the new target pixel. On the other hand, where the target pixel is a pixel situated at the right edge of the image, the pixel at the left edge in the row immediately below the target pixel is set as the new target pixel. Then, Steps S213 through S219 are executed repeatedly until it is determined in Step S218 that bandwidth computation is carried out for all pixels of the target image.

In this way the maximum bandwidth computing module 252 computes the maximum value of bandwidth (maximum bandwidth) required for all pixels. After computing the maximum bandwidth, in Step S220 of FIG. 9, the band buffer allocation module 254 (FIG. 1) allocates a band buffer of maximum bandwidth sufficient to store the source image (source image buffer) which constitutes the image prior to modification. Next, in Step S230, for each individual modification process the band buffer allocation module 254 allocates a band buffer of maximum bandwidth sufficient to store the image after the modification process (modified image buffer). After the allocation of the modified image buffer, the process returns to the facial shape-corrected printing process of FIG. 3. Since the modified image buffer is the area in which the image subjected to the modification process is generated, it can also be termed the "image modification area."

In Step S300 of FIG. 3, the modification executing module 256 (FIG. 1) carries out a line modification process to transform the image by setting the pixel values of individual pixels within a single line. Here, a line refers to a row of pixels equivalent to one vertical pixel, extending throughout the entire image in the horizontal direction.

Figure 13:
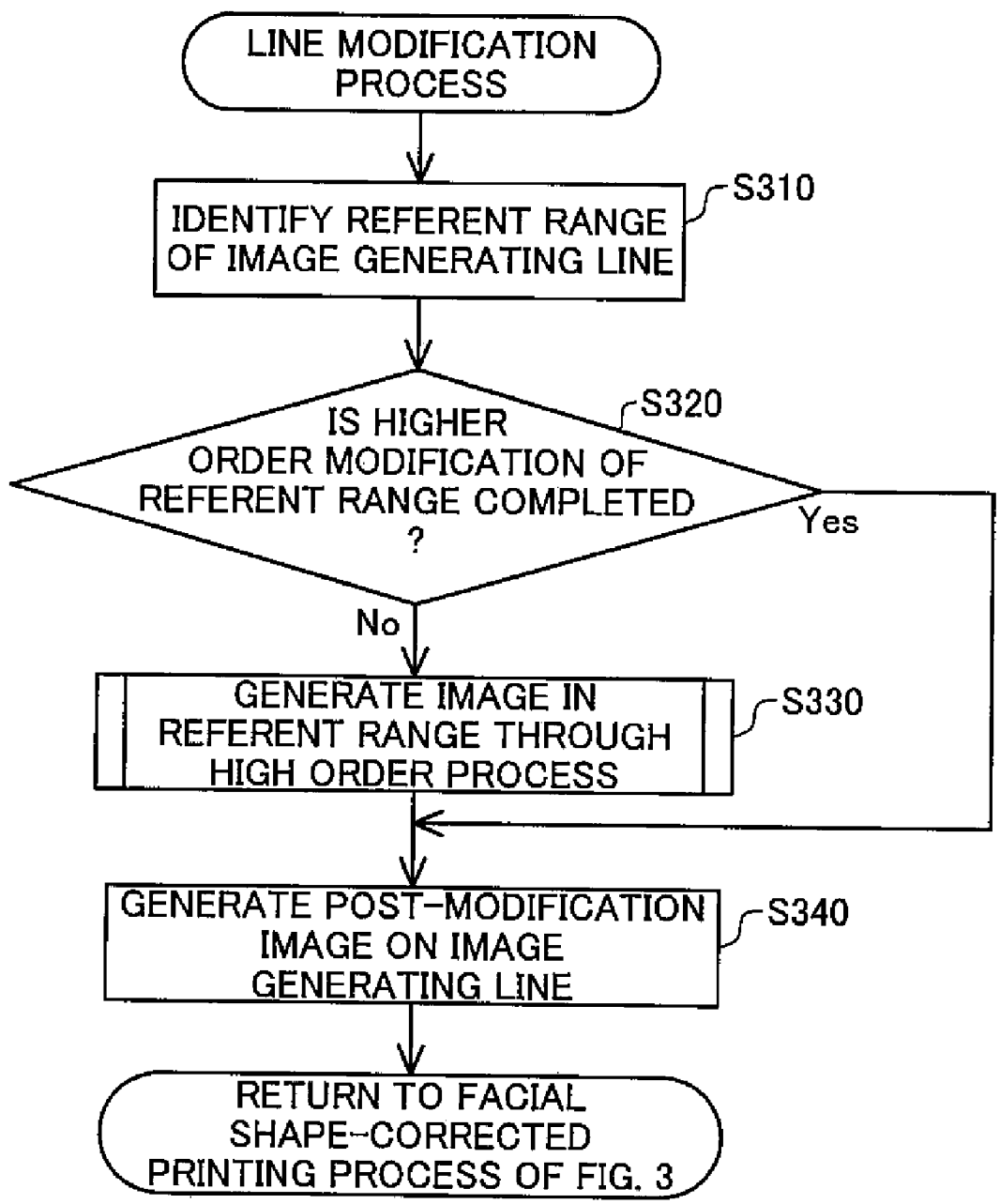
FIG. 13 is a flowchart of the line modification process executed in Step S300.

FIG. 13 is a flowchart of the line modification process executed in Step S300. FIGS. 14A through 14E are illustrations depicting generation of a transformed image through the line modification process. Each figure at the left column of FIGS. 14A through 14E depicts the respective images prior to modification. Each figure at the center column of FIGS. 14A through 14E depicts the respective images subsequent to the first modification process. Each figure at the right column of FIGS. 14A through 14E depicts the respective images subsequent to the second modification process.

FIG. 14A depicts the situation prior to carrying out the initial line modification process. The initial line modification process is carried out on the line at the top edge of the image. Thus, as shown in FIG. 14A, the image generating line (hatched portion) is established to a line at the topmost of the image. In the situation depicted in FIG. 14A, a line modification process for setting pixels values is not yet carried out, and so neither the image subsequent to the first modification process nor the image subsequent to the second modification process is generated at this time.

In Step S310, the modification executing module 256 identifies a referent range as the "source" of the modification process referred from the image generating line which is the target of the modification process (the "destination" of the modification process). Specifically, the modification executing module 256 computes the position of a referent pixel for each pixel in the image generating line. A range extending through the entire image in the horizontal direction whose vertical direction extends between the upper and lower edges of the referent pixels is then identified as the referent range. FIG. 14B depicts a situation in which the referent range of the image generating line is identified. As shown by the arrows, a referent range of the image generating line in the image after the first modification process is identified.

In Step S320, the modification executing module 256 determines whether the modification of the referent range in the higher order modification process is completed, that is, whether an image in the referent range is generated through the higher order modification process. If it is determined that the modification of the referent range in the higher order modification process is completed, the process moves to Step S340. On the other hand, if it is determined that the modification of the referent range in the higher order modification process is not completed, the process advances to Step S330. The determination as to whether the modification of the referent range is completed can be made by providing, for each of the multiple lines constituting the modified image in the higher order modification process, a flag which indicates whether generation of an image is completed. In the example of FIGS. 14A through 14E, as shown in FIG. 14B, a modified image in the higher order modification process is generated through the first modification process. Therefore it is determined that the modification of the referent range which is referred from range indicated by hatching is not completed, and the process advances to Step S330.

In Step S330, the modification executing module 256 generates a modified image within the referent range through a higher order modification process. In the example of FIG. 14A through 14E, a referent in the source image is identified from the referent range indicated by hatching as shown in FIG. 14C, as shown by the arrows. Then, as indicated by the arrows in FIG. 14D, an image derived by carrying out the first modification process on the image of the referent in the source image is generated within the referent range. The specifics of the process for generating a modified image through a higher order modification process in the referent range (referent range image generation process) will be discussed later. As is apparent from the preceding description, the source in the lower order modification process serves as the destination in the higher order modification process.

In Step S340, the modification executing module 256 generates a post-modification image on the image generating line. Specifically, as shown in FIG. 14E, by carrying out the second modification process on the image generated in the referent range, an image undergoes the second modification process is generated on the image generating line. An image sequentially undergoes the first modification process and the second modification process respectively (a multiply-modified image) is generated thereby on the image generating line.

Figure 15:
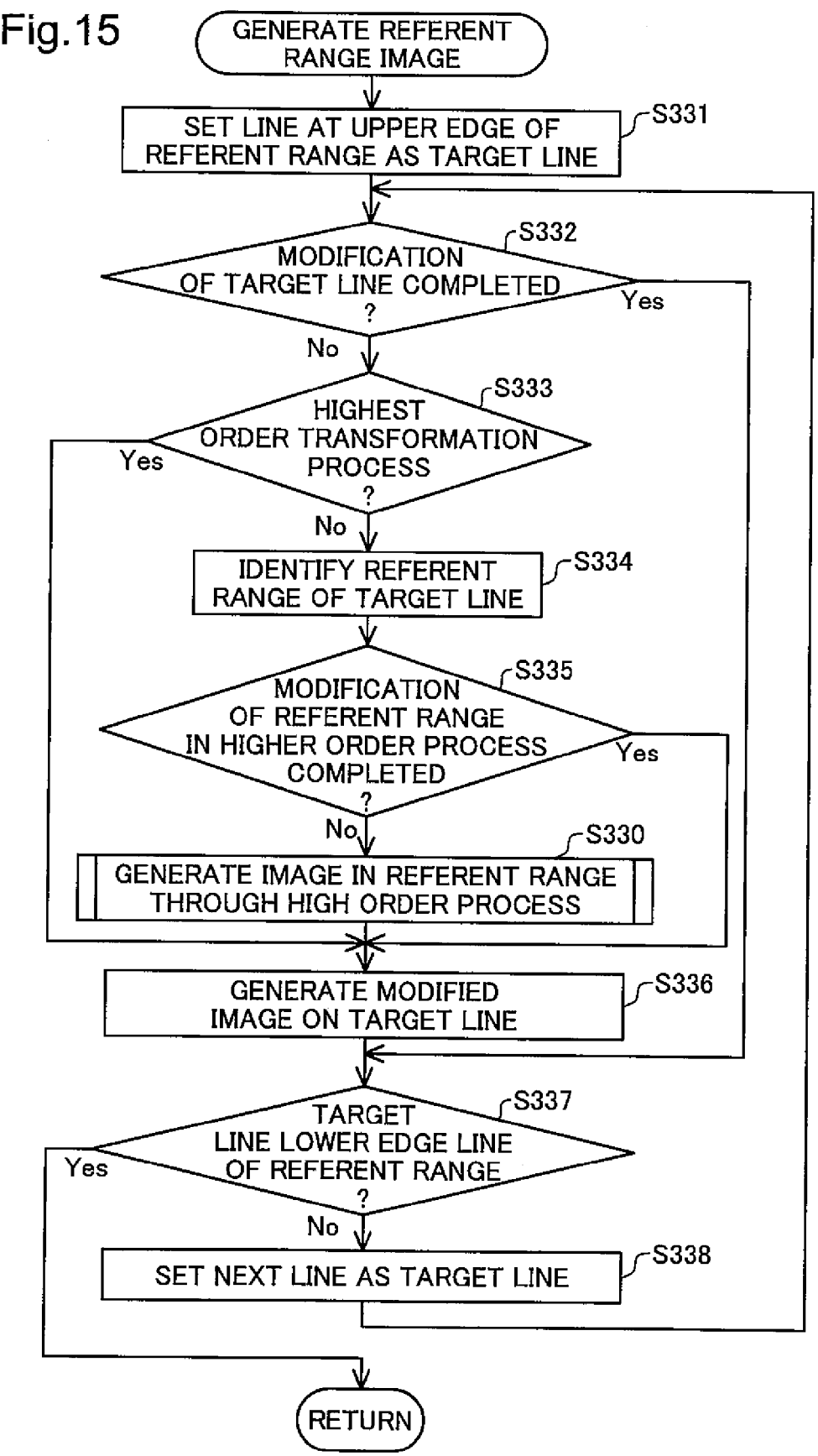
FIG. 15 is a flowchart of the referent range image generation process executed in Step S330.

FIG. 15 is a flowchart of the referent range image generation process executed in Step S330. FIGS. 16A through 16E are illustrations depicting the band buffer when the image modification process is carried out. Each figure at the left column of FIGS. 16A through 16E shows the source image buffer. Each figure at the center column of FIGS. 16A through 16E shows the first modified image buffer for the first modification process. Each figure at the right column of FIGS. 16A through 16E shows the second modified image buffer for the second modification process.

FIG. 16A shows that the post-modification image has been generated on the image generating line situating at the upper edge. As mentioned above, since the post-modification image is generated on the image generating line, the modified image in the first modification process is generated in the referent range of the image generating line in the first modification process buffer. Once generation of the post-modification image on the image generating line is completed, the line is shifted downward by one pixel as shown in FIG. 16B. At this point, an image of one line is read into the source image buffer from the memory card MC (FIG. 1). The line at the upper edge of the band buffer, indicated by the broken line, is then discarded.

The hatched area of the second image modification buffer of FIG. 16B indicates the image generating line subsequent to line shift. Then, in Step S310 of FIG. 13, the referent range of this image generating line is identified as the range in the first image modification buffer indicated by the heavy-line frame. As shown in FIG. 16B, in the referent range of the image generating line, the one line at the lower edge of a post-modification image is not yet generated. Thus, in Step S320 of FIG. 13 it is determined that the generation of the referent range is not completed, and in Step S330 the referent range image generation process shown in FIG. 15 is executed.

In Step S331, the modification executing module 256 sets the line at the upper edge of the referent range as the target line. Then, in Step S332, it is determined whether modification of the target line is completed, that is, whether a modified image is already generated. If it is determined that modification of the target line is completed, the process moves to Step S337. On the other hand, if it is determined that modification of the target line is not completed, the process advances to Step S333.

In the example of FIGS. 16A through 16E, as shown in FIG. 16A, a modified image in the first modification process is generated in the first image modification buffer during generation of a post-modification image in the image generating line on the upper edge. Thus, in Step S332, it is determined that modification of the target line is completed, and the process moves to Step S337.

In Step S337, the modification executing module 256 determines whether the target line is the lower edge of the referent range. If it is determined that the target line is the lower edge of the referent range, the process of FIG. 15 terminates and control returns. On the other hand, if it is determined that the target line is not the lower edge of the referent range, the process advances to Step S338. Then, in Step S338, the modification executing module 256 set the next line (line below) of the target line as the new target line.

In this way, two Steps S332 and S338 are executed repeatedly during the target line is within the upper part of the referent range indicated by the heavy-line frame in FIG. 16B, and the target line is sequentially shifted downward from the upper edge of the referent range. When the one line at the lower edge of the referent range is set as the target line by shifting the target line sequentially downward, in Step S332, it is determined that the modification of the target line is not completed. Then, the process moves from Step S332 to Step S333.

In Step S333, the modification executing module 256 determines whether the modification process for generating an image on the target line is the highest order modification process. If it is determined that the modification process is the highest order modification process, the process goes to Step S336, and a modified image is generated on the target line. On the other hand, if it is determined that the modification process is not the highest order modification process, the process advances to Step S334.

In Step S334, the modification executing module 256 identifies the referent range of the target line in the same manner as in Step S310 of FIG. 13. Next, in Step S335, the modification executing module 256 determines whether modification of the referent range of the target line is completed in the higher order modification process in the same manner as in Step S310 of FIG. 13. If it is determined that modification of the referent range of the target line is completed in the higher order modification process, the process goes to Step S336. On the other hand, if it is determined that modification of the referent range of the target line is not completed in the higher order modification process, the process advances to Step S330 and the referent range image generation process is executed recursively. Through recursive execution of the referent range image generation process in this way, a post-modification image is generated on the target line through the higher order modification process, even where multiple modification processes are carried out.

In the example of FIG. 16A through 16E, the first modification process is the highest order modification process. Accordingly, in Step S333 it is determined that the modification process is the highest order modification process. Next, in Step S336, an image derived by performing the first modification process on the source image on the one line at the lower edge of the referent range is generated as shown in FIG. 16D. In this way, through the referent range image generation process, an image undergoes the first modification process is generated in the referent range within the first image modification buffer. A post-modification image is then generated by carrying out the second modification process on the image of the referent range in the first image modification buffer, as shown in FIG. 16E.

Once the post-modification image is generated on the image generating line in this way, the line modification process shown in FIG. 13 terminates, and control returns to the facial shape-corrected printing process shown in FIG. 3.

In Step S410 of FIG. 3, a printing of the image generating line, where the post-modification image is generated, is carried out. Specifically, data representing an image of the image generating line (line data) is supplied to the printing process module 320. In the printing process module 320, the supplied line data is accumulated as needed, and processes such as resolution conversion and halftoning are carried out to generate print data. The print data so generated is supplied from the printing process module 320 to the printer engine 160.

In Step S420, it is determined whether the line modification process (Step S300) and the line printing process (Step S410) have been carried out for all lines of the target image. If it is determined that these processes are completed for all lines, the facial shape-corrected printing process of FIG. 3 terminates. On the other hand, if it is determined that unprocessed line remains, the process advances to Step S430.

In Step S430, the image generating line targeted for the modification process shifts to the next line as described above. Then, Steps S300 through S430 are executed repeatedly until it is determined in Step S420 that the line modification process (Step S300) and the line printing process (Step S410) are completed for all lines. This provides that an image derived by performing the modification process on the target image is printed with the print engine 160.

In this way, in the present embodiment, at the time of modification of a target image, the maximum bandwidth required for determination of the pixel values of all pixels constituting a post-modification image is computed in advance. By then allocating a band buffer having the maximum bandwidth so computed, the target image can be modified using the image which stored in the band buffer. As a result, the amount of memory required for the target image modification process can be reduced.

In the embodiment where a single target image is being modified, the bandwidth of the band buffer is fixed at the maximum bandwidth. For this reason, the number of allocation of the band buffer can be reduced in comparison to the case of determining required bandwidth on a line-by-line basis and allocating a band buffer having the bandwidth so determined. Accordingly, the processing time required for modifying the target image can be reduced.

Furthermore, in the embodiment, by allocating a band buffer with pre-computed maximum bandwidth, even where the line generating a post-modification image has shifted, a part of the image stored in the band buffer or generated in the band buffer prior to the line shift can continue to be used as-is. It is therefore possible to omit saving of the image in the band buffer or regenerating the image into the band buffer, and the processing time required for transforming the target image can be shortened thereby.

In this embodiment, the post-modification images is generated on a line-by-line basis. It is also acceptable to generate the post-modification image on a block-by-block basis of any form so long as an individual block constitutes parts of the post-modification image. For example, an oblong area which is a part of the post-modification image, or a pixel block which is a part of a line may be used as a block in which the post-modification image is generated.

In this embodiment, a facial shape modification process is described as an example of image modification process. Any image modification process, which is different from a facial shape modification process, for modifying an object contained in images may be performed in similar manner as described above.

In this embodiment, entirety of the image modification area is modified by dividing the image modification area into sub-areas and modifying the divided sub-areas. The step of dividing the modification area may also be omitted. The present invention is applicable generally to modification processes of any form, provided that the modification process involves mapping.

In this embodiment, a second image modification buffer is allocated and a band of the post-modification image is stored in the second image modification buffer. However, as long as an area sufficient to store the image generating line is secured, allocation of the band buffer for storing the post-modification image may also be omitted. It is possible to generate a post-modification image on the image generating line in this manner as well.

In this embodiment, the modification processes for each of a plurality of image modification areas are carried out individually. The modification for the plurality of image modification areas may also be carried out through a single modification process. In this case, a position on the source image, of a pixel associated with a target pixel of the post-modification image which is generated finally, is determined. Then, the pixel value of the target pixel is assigned from the pixel value of the pixels associated with the target pixels.

In this embodiment, the printing process is carried out on a line-by-line basis for the image generating lines. It is not necessary to carry out the printing process on a line-by-line basis. For example, it is acceptable to allocate an area for storing the entire post-modification image which is the generated finally, and then proceed to store the generated image line-by-line in this area.

B. Variations

The present invention is not limited to the embodiment shown hereinabove and may be reduced to practice in various other forms without departing from the spirit thereof. Variations such as the following would be possible, for example.

B1. Variation 1:
In the embodiment hereinabove, the present invention is implemented in a printer 100. The present invention may also be implemented in any type of apparatus which has the function of carrying out an image modification process, provided that the apparatus carries out a modification process which generates a post-modification image from a source image. For example, the present invention can be implemented in a personal computer or a digital camera so long as the device has the function of carrying out an image modification process.

B1. Variation 2:
Some of the arrangements realized with hardware in the preceding embodiment may be replaced by software, and conversely some of arrangements realized with software may be replaced by hardware.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. An image processing apparatus that carries out a modification process on a pre-modification image to generate a post-modification image within an image modification area, the image processing apparatus comprising:

a target block setting unit that establishes a target block as a destination of the modification process, the target block constituting the image modification area;

a block modification unit that generates an image within the target block by storing an image included in a referent block, which is associated with the target block, into a source memory area, and by referring the image included in the referent block stored in the source memory area as a source of the modification process;

a block scanning unit that generates entirety of the post-modification image by sequentially shifting the target block to a different position within the image modification area, and by causing the block modification unit to generate an image within the target block after each shift;

a maximum block size computing unit that computes a maximum block size of the referent block associated with the target block situated any available position, the maximum block size being computed prior to generation of the image of the target block by the block modification unit; and a source memory area allocating unit that allocates the source memory area capable of storing an image of a size equal to the maximum block size computed by the maximum block size computing unit.

2. The image processing apparatus according to claim 1 wherein the image processing apparatus is capable of generating a multiply-modified image by carrying out the modification process on the source image for N times (where N is an integer equal to 2 or greater), the maximum block size computing unit has an utmost block size computing unit that computes an utmost block size prior to the N modification processes by taking a logical summation of N referent blocks, each of the N referent blocks being referred from a target block established within the image modification area of the multiply-modified image in each of the N modification processes, the memory area allocating unit allocates N source memory areas capable of storing images of a size equal to the utmost block size, each of the source memory area corresponding to each of the modification processes, and of the N source memory areas, the i-th (i is an integer from 1 to N) source memory area is used as the source of the i-th modification process, and as the destination of the (i-1)th modification process.

3. An image processing method of carrying out a modification process on a pre-modification image to generate a post-modification image within an image modification area, the image processing method comprising:

(a) establishing a target block as a destination of the modification process, the target block constituting the image modification area;

(b) generating an image within the target block by storing an image included in a referent block, which is associated with the target block, into a source memory area, and by referring the image included in the referent block stored in the source memory area as a source of the modification process;

(c) sequentially shifting the target block to a different position within the image modification area, the step (b) generating an image within the target block after each shift to generate entirety of the post-modification image;

(d) prior to generation of an image of the target block in the step (b), computing a maximum block size of the referent block associated with the target block situated in any available position; and (e) allocating the source memory area capable of storing an image of a size equal to the maximum block size computed in the step (d).

4. A computer program product for carrying out a modification process on a pre-modification image to generate a post-modification image within an image modification area, the computer program product comprising:

a non-transitory computer-readable medium; and a computer program stored on the computer-readable medium includes:

a first computer program for causing a computer to establish a target block as a destination of the modification process, the target block constituting the image modification area;

a second computer program for causing the computer to generate an image within the target block by causing the computer to store an image included in a referent block, which is associated with the target block, into a source memory area, and to refer the image included in the referent block stored in the source memory area as a source of the modification process;

a third computer program for causing the computer to shift the target block to a different position within the image modification area sequentially, the computer executing the second computer program generating an image within the target block after each shift to generate entirety of the post-modification image;

a fourth computer program for causing the computer to compute a maximum block size of the referent block associated with the target block situated in any available position, prior to generation of an image of the target block by the computer executing the second computer program; and a fifth computer program for causing the computer to allocate the source memory area capable of storing an image of a size equal to the maximum block size computed by the computer executing the fourth computer program.

* * * * *